March 11, 1930. J. K. HICKS 1,750,595
ADJUSTABLE RIDING BREECHES LEG
Filed April 1, 1929
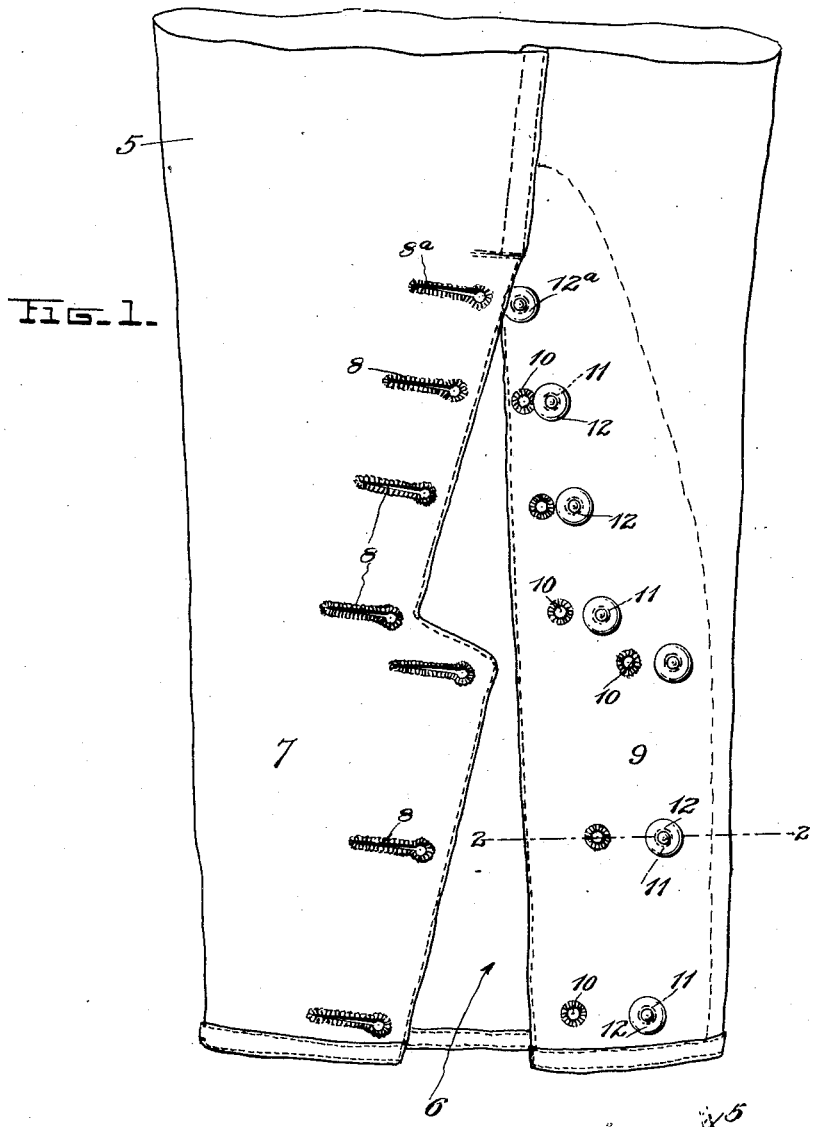

Patented Mar. 11, 1930

1,750,595

UNITED STATES PATENT OFFICE

JOHN K. HICKS, OF EL PASO, TEXAS

ADJUSTABLE RIDING-BREECHES LEG

Application filed April 1, 1929. Serial No. 351,735.

The invention aims to provide a new and improved adjustment for the lower ends of riding breeches legs, so as to permit adjustment of them to legs of different sizes without impairing the shape of the breeches legs.

With the foregoing in view, the invention resides in the novel subject matter hereinafter described and claimed, description being accomplished by reference to the accompanying drawing.

Fig. 1 is a side elevation of the lower end of a breeches leg constructed in accordance with my invention.

Fig. 2 is an enlarged horizontal sectional view on line 2—2 of Fig. 1.

A breeches leg 5 is shown having a vertical split 6 extending upwardly from its lower end for the usual distance. The leg portion 7 along one edge of the split 6, is provided with a plurality of vertically spaced button-holes 8, and said edge is preferably of the offset form shown. The leg portion 9 at the other side of the split 6 is formed with two rows of small openings, the openings of one row being denoted at 10 and those of the other row at 11. These openings 10—11 are horizontally spaced apart distances which gradually decrease from the lower toward the upper end of the split 6, there being preferably about one inch between the lowermost openings 10—11 and less than a half inch between the uppermost of these openings.

Buttons 12 are provided with eyes 13 which may be passed through either the openings 10 or the openings 11 according to the required leg size and appropriate fasteners 14 are engageable with these eyes at the interior of the leg. At the upper extremity of the split 6, an additional permanently located button 12ª is shown which may be secured in place in the same manner as the buttons 12. An additional button-hole 8ª is also provided above the button-holes 8 for co-action with the button 12ª regardless of the row of openings 10—11 with which the buttons 12 be engaged.

By providing the novel construction shown and described, the leg is readily adjustable as required and by having the range of adjustment greater at the lower end of the split 6 and gradually diminishing to the upper end of said split, the shape of the breeches leg will not be impaired in any manner whether adjusted inwardly or outwardly.

The leg portion 9 is preferably reinforced at its inner side by an appropriate ply 15 and a similar reinforcement (not shown) is preferably used for the leg portion 7, the two reinforcements being secured by the button-hole stitching around the edges of the openings 8—8ª and 10—11. Then too, a fabric flap 16 is preferably provided of a width to extend over the fasteners 14 whether the buttons 12 be engaged with the openings 10 or the openings 11. This flap is stitched along one edge of the split 6 and at the lower end of the breeches leg but is otherwise free to give access to the fasteners 14 when the buttons are to be removed for adjustment or for cleaning and pressing of the garment.

Excellent results are obtainable from the details disclosed and they are preferably followed. However, within the scope of the invention as claimed, minor variations may be made.

I claim:

1. An adjustable riding breeches leg having a slit extending upwardly from its lower end, the leg portion at one side of said slit being provided with a row of button holes, the leg portion at the other side of said slit being provided with a plurality of rows of small openings, said small openings being horizontally spaced apart distances which gradually decrease from the lower toward the upper end of the slit, one set of buttons having eyes insertable through said small openings of any of said rows, and one set of fasteners insertable through said eyes at the interior of the leg, said button-holes being co-operable with said buttons when the latter are engaged with any of said rows of small openings.

2. A structure as specified in claim 1; together with an additional permanently located button at the upper extremity of said slit and an additional co-acting button-hole.

3. A structure as specified in claim 1; together with a flap within said leg stitched thereto along said other side of said slit and at the lower end of the leg, said flap being of a width to cover said fasteners when said buttons are engaged with either of said rows of small openings.

In testimony whereof I have hereunto affixed my signature.

JOHN K. HICKS.